Feb. 21, 1967 L. D. BECHTOL ET AL 3,305,446
METHOD OF PREPARING PARENTERAL SOLUTION
Filed Jan. 7, 1963
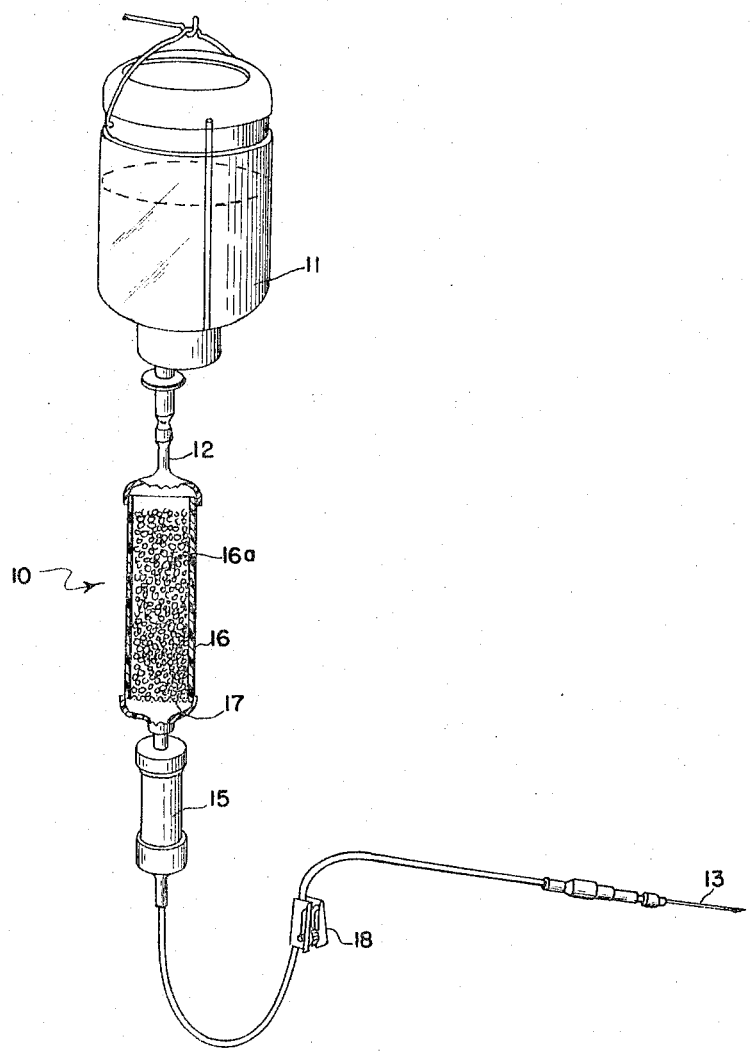
*INVENTORS*
DAVID BELLAMY JR.
LAVON D. BECHTOL
BY
*J. F. Krejsbach*
ATTORNEY

United States Patent Office 3,305,446
Patented Feb. 21, 1967

3,305,446
METHOD OF PREPARING PARENTERAL SOLUTION
Lavon D. Bechtol, Barrington, and David Bellamy, Jr., Glenview, Ill., assignors to Baxter Laboratories, Inc., Morton Grove, Ill., a corporation of Delaware
Filed Jan. 7, 1963, Ser. No. 249,831
3 Claims. (Cl. 167—72)

The present invention relates to a method of preparing parenteral solutions. More particularly, it relates to a novel method of preparing sterile parenteral solutions of the type which are difficult to sterilize or unstable during storage.

The vast majority of solutions employed in parenteral fluid administration are available commercially in sterile, pre-packaged form. However, a number of parenteral solutions because of the difficulty involved in their sterilization or their instability during storage are not available in such a commercial pre-packaged form.

An example of such a type of solution is that class of solution which contain the bicarbonate ion. These solutions because of the breakdown of the bicarbonate ion to carbon dioxide gas are extremely difficult to sterilize. Furthermore, they are relatively unstable in glass storage containers.

It is an object of the present invention to disclose a novel method of preparing sterile parenteral solutions.

It is a further object to disclose a novel method for the extemporaneous preparation of parenteral solutions.

These and still further objects are accomplished by the present invention, which will be described in detail in the specification as it proceeds.

It has now been discovered that a sterile parenteral solution may be prepared by the novel method which comprises placing a sterile ion exchange resin on the desired anionic cycle, eluting said resin with a sterile solution containing a second anionic group which replaces the anion originally on the resin, and then collecting the elluent which constitutes a sterile solution containing the desired anion and which is suitable for parenteral administration.

The inventive method will be further described in connection with the drawing of the preferred form of administration apparatus in which the numeral 10 represents the preferred parenteral fluid administration apparatus generaly, and numeral 11 refers to a conventional container of a parenteral solution, preferably containing isotonic saline solution. The numeral 12 refers to a flexible plastic set or conduit for the flow of fluid from the container 11 to a recipient via the needle 13. Interposed along the set 12 is a flow indicator, e.g. the dripmeter 15. Between the dripmeter 15 and the point of connection of the set to the container is a columnar member 16 containing an ion exchange resin 16a on a desired anionic cycle. The resin is retained within the member 16 by a filter 17.

The rate of the flow of the fluid through the columnar member 16, the drip tube 15, the needle 13 and the intermediate tubing is controlled by the control means 18, e.g. a roller clamp or the like.

In the preferred practice of the present invention the columnar member 16 is packed with a strongly basic anion exchange resin 16a such as those which contain quaternary ammonium groups and which are capable of splitting salts in addition to adsorbing acids. The resin is then placed on the desired anionic cycle by passing a solution containing the desired anion through the column until the effluent is free of undesired anions. The columnar member is then rinsed with distilled water and sterilized. The columnar member may then be incorporated into an administration set as shown in the drawing or alternatively provided with connectors at each end so that it may be combined at a later time with the other elements of an administration set to form an integral unit.

The practice of the present inventive method is further illustrated by reference to the following example.

*Example*

106 gms. of an anion exchange resin of a strongly basic nature and containing quaternary ammonium groups (Amberlite IRA 402) is placed on the bicarbonate cycle by passing a 10% $NaHCO_3$ solution over the resin. The effluent is tested until it is chloride ion free and the resin is then rinsed with distilled water. It is then packed in a plastic tube 11.5 inches long and 1 inch in diameter, which is sealed at each end in a moisture vapor pervious manner. The unit is then steam sterilized.

The sterile column of resin is connected with the required elements of a conventional administration set to form a continuous conduit equipped at one end with an adapter to facilitate its connection to a bottle of isotonic saline.

The connection is made and 1000 cc. of sterile saline solution is passed through the resin column. The resulting effluent solution contained 154 meq. or about 1.3% of bicarbonate by weight. The sterile solution thus obtained was suitable for injection.

The ion exchange resins preferred for use in the present invention are the relatively strong basic anion exchange resins which possess the capability of splitting salts as well as adsorbing acids. Examples of such resins include those resins prepared by polymerizing a mixture of styrene and divinyl benzine, haloalkylating the resulting polymer, and treating the product with a tertiary amine to form the quaternary ammonium groups. Commercially available resins of this type are those available from Dow Corning Co. under the trademark Dowex I–X8 and those available from Rohm and Haas Corp. under the trademark Amberlite IRA–400 and IRA–402. The foregoing resins may be prepared by the methods disclosed in one of the following patents: U.S. Patent No. 2,591,573 and U.S. Patent No. 2,614,009. Of course, still other resins may be used provided they are capable of performing the desired function.

Other sterile parenteral solutions other than sodium bicarbonate solution may be prepared by the present invention. For example, potassium bicarbonate solution may be prepared by utilizing potassium chloride as the sterile solution to be passed over the resin on the bicarbonate cycle. Combination solutions containing sugar as well as electrolytes may also be prepared in this manner merely by utilizing a conventional saline and dextrose solution as the solution to be passed over the resin. In addition, parenteral solutions may be prepared by placing the resin on other anionic cycles in place of the bicarbonate cycle such as the lactate cycle, the ascorbate cycle, the heparin cycle, and the like.

The practice of the present invention provides considerable advantage over the previous methods. For example, it eliminates the previously described difficulties which exist during manufacture, storage and handling. In addition to the preparation of conventional solutions the practice of the present invention may be used to produce a variety of combination solutions which previously could not be prepared. Still other advantages will be obvious to those skilled in the art relating to parenteral solutions.

In the foregoing specification, specific examples of materials, procedures and apparatus have been given. However, it is to be understood that the present inven-

What we claim is:

1. The process of immediately administering a sterile parenteral solution containing bicarbonate ions which is prepared by the successive steps of preparing a sterile solution containing chloride ions, contacting said chloride containing solution with a sterile body of anion exchange resin comprising bicarbonate ions whereby a sterile parenteral solution containing bicarbonate ions suitable for parenteral administration is obtained, and immediately administering said sterile parenteral solution.

2. The process of immediately administering a sterile parenteral solution containing sodium bicarbonate which is prepared by the successive steps of preparing a sterile solution containing sodium chloride, contacting said sodium chloride solution with a sterile body of anion exchange resin comprising bicarbonate ions whereby a sterile solution containing sodium bicarbonate suitable for parenteral administration is obtained and immediately administering said sterile parenteral solution.

3. The process of immediately administering a sterile parenteral solution containing potassium bicarbonate which is prepared by the successive steps of preparing a sterile solution containing potassium chloride, contacting said potassium chloride solution with a sterile body of anion exchange resin comprising bicarbonate ions whereby a sterile solution containing potassium bicarbonate suitable for parenteral administration is obtained, and immediately administering said sterile parenteral solution.

References Cited by the Examiner

UNITED STATES PATENTS

| | | | |
|---|---|---|---|
| 2,662,046 | 12/1953 | Howe | 167—72 |
| 2,989,370 | 6/1961 | Lee et al. | 210—37 |

OTHER REFERENCES

Osol et al., Dispensatory of the United States of America, 25th ed., Part I, Mannitol Injection to Zinc, Undecylenate, copyright 1955 by J. B. Lippincott Co., page 1255 relied upon.

JULIAN S. LEVITT, *Primary Examiner.*

MORRIS O. WOLK, FRANK CACCIAPAGLIA, JR.,
*Examiners.*

EDWARD G. WHITBY, *Assistant Examiner.*